(12) United States Patent
Roth

(10) Patent No.: US 9,291,395 B2
(45) Date of Patent: Mar. 22, 2016

(54) SPLASH BAR ASSEMBLY AND METHOD OF INSTALLATION

(71) Applicant: SPX Cooling Technologies, Inc., Overland Park, KS (US)

(72) Inventor: William M. Roth, Lee's Summit, MO (US)

(73) Assignee: SPX COOLING TECHNOLOGIES, INC., Overland Park, KS (US)

(*) Notice: Subject to any disclaimer, the term of this patent is extended or adjusted under 35 U.S.C. 154(b) by 180 days.

(21) Appl. No.: 14/210,790

(22) Filed: Mar. 14, 2014

(65) Prior Publication Data

US 2015/0014869 A1   Jan. 15, 2015

Related U.S. Application Data

(60) Provisional application No. 61/844,589, filed on Jul. 10, 2013.

(51) Int. Cl.
  *F28C 1/00* (2006.01)
  *B01F 3/04* (2006.01)
  *F28C 1/04* (2006.01)
  *F28F 25/08* (2006.01)

(52) U.S. Cl.
  CPC ... *F28C 1/04* (2013.01); *B01F 3/04* (2013.01); *F28C 1/00* (2013.01); *F28F 25/082* (2013.01); *F28F 25/085* (2013.01); *Y10T 29/49863* (2015.01)

(58) Field of Classification Search
  CPC ................. F28C 1/00; F28C 1/04; B01F 3/04
  USPC .................................. 261/34.1, 111, DIG. 11
  See application file for complete search history.

(56) References Cited

U.S. PATENT DOCUMENTS

| | | | | |
|---|---|---|---|---|
| 5,112,537 A | * | 5/1992 | Kinney, Jr. ............ | F28C 25/082 261/111 |
| 6,877,727 B2 | * | 4/2005 | Olson ................... | F28F 25/082 261/111 |

* cited by examiner

*Primary Examiner* — Robert A Hopkins
(74) *Attorney, Agent, or Firm* — Baker & Hostetler LLP

(57) ABSTRACT

A fill assembly for evaporative cooling includes a plurality of splash bars, a grid to support the plurality of splash bars, and a pivot connection at an intersection between the grid and a splash bar of the plurality of splash bars. The fill assembly is configured to translate from an upright conformation to a compact conformation in response to the plurality of splash bars pivoting relative to the grid.

20 Claims, 15 Drawing Sheets

SPLASH BAR ASSEMBLY AND METHOD OF INSTALLATION

CROSS REFERENCE TO RELATED APPLICATIONS

This application claims priority to U.S. Provisional Application Ser. No. 61/844,589, filed on Jul. 10, 2013, titled "SPLASH BAR ASSEMBLY AND METHOD OF INSTALLATION," the disclosure of which is incorporated herein by reference in its entirety.

FIELD OF THE INVENTION

This invention relates generally to an improved heat exchange splash bar apparatus and method for installing fill assemblies in evaporative water cooling towers or the like. More particularly, the present invention relates, for example, to an assembly and method to improve the process of installing fill assemblies in evaporative water cooling towers.

BACKGROUND OF THE INVENTION

Generally, evaporative water cooling towers include an upper hot water distribution system. Examples of upper hot water distribution system may have a series of water distribution nozzles or an apertured distribution basin or the like, and a cold water collection basin positioned at the base or bottom of the cooling tower. Commonly, a splash-type water dispersing fill structure is disposed in the space between the hot water distribution system and the underlying cold water collection basin. The aforementioned fill structure oftentimes includes either a plurality of elongated, horizontally arranged and staggered splash bars supported at spaced intervals by an upright grid structure or frame assembly, or a series of fill packs composed of a number of film fill sheets. During assembly of the evaporative cooling towers, typically, an outer shell or support structure is built first and then a rack or grid support is affixed to the support shell. Splash bars are then threaded into the rack.

The splash bars generally provide a surface for consistent, predictable dispersal and breakup of the water droplets over a range of water loadings typically encountered during operation of the evaporative cooling tower. Typically, these splash bars are long and thin and the fill structure includes a great number of them. Unfortunately, the same characteristics that make an efficient splash bar and fill assembly also make the fill assembly difficult, tedious, expensive, and time consuming to install.

Accordingly, there is a need in the art to improve the installation of a splash bar apparatus.

SUMMARY OF THE INVENTION

The foregoing needs are met, to a great extent, by the present invention, wherein aspects of a splash bar assembly and method of installation are provided.

An embodiment of the present invention pertains to a fill assembly for evaporative cooling. The fill assembly includes a plurality of splash bars, a grid to support the plurality of splash bars, and a pivot connection at an intersection between the grid and a splash bar of the plurality of splash bars. The fill assembly is configured to translate from an upright conformation to a compact conformation in response to the plurality of splash bars pivoting relative to the grid.

Another embodiment of the present invention relates to a method for installing a fill assembly in a cooling tower. In this method, the fill assembly is assembled by generating a pivot connection at an intersection between a grid and a splash bar of a plurality of splash bars. The fill assembly is configured to translate from an upright conformation to a compact conformation in response to the plurality of splash bars pivoting relative to the grid. The fill assembly is translated to the compact conformation. The fill assembly is disposed in the compact conformation into the cooling tower. The fill assembly is translated from the compact conformation to the upright conformation.

Yet another embodiment of the present invention pertains to a fill component for evaporative cooling. The fill component includes a grid and a pivot connection. The grid has a plurality of upright members and a plurality of horizontal members. The pivot connection is at each horizontal member of the plurality of horizontal members. The fill component is configured to translate from an upright conformation to a compact conformation in response to the grid pivoting at the pivot connection relative to another fill component.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
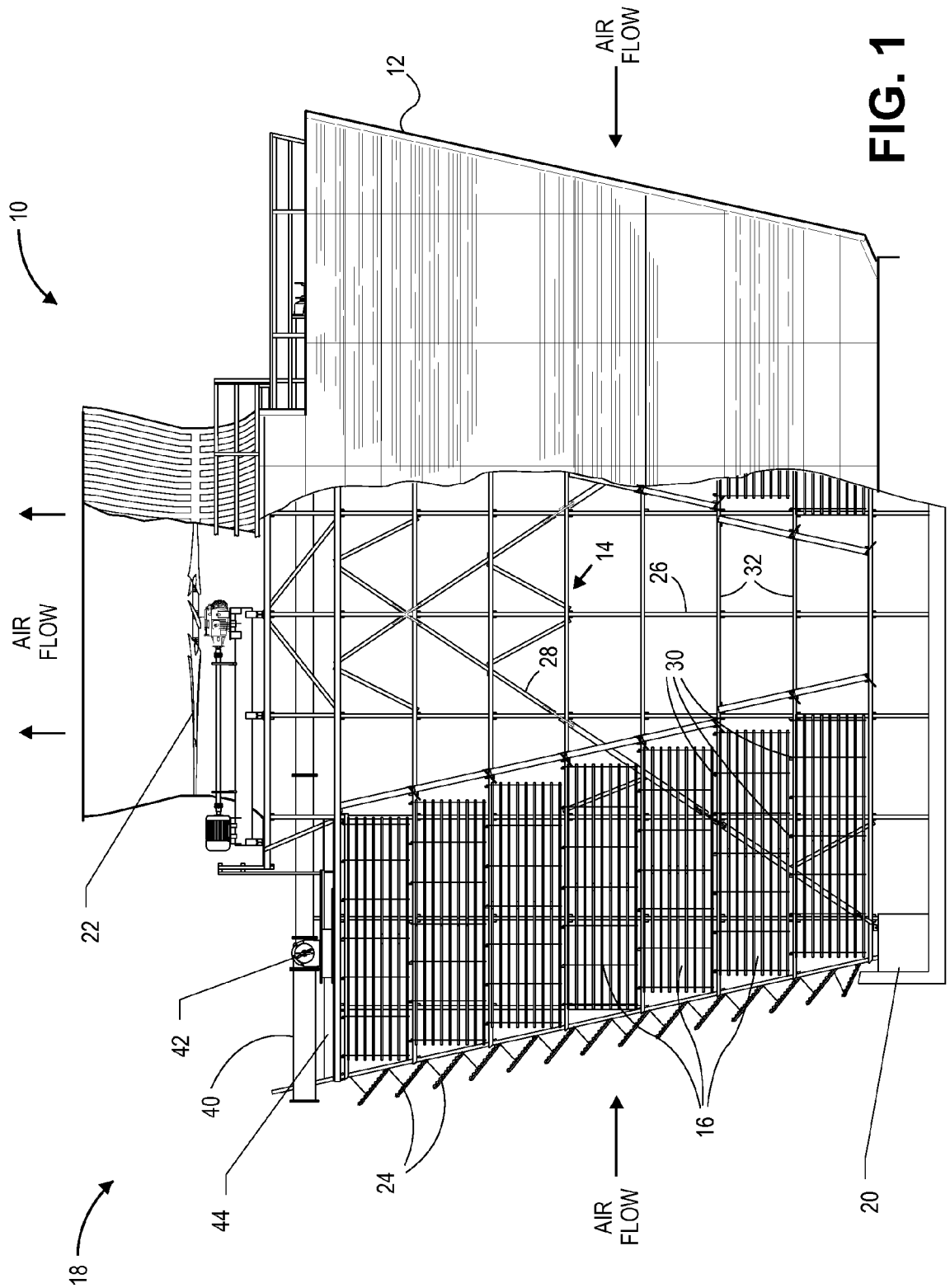
FIG. 1 is a partial cross sectional view of a cooling tower suitable for use with an embodiment of the present invention.

Various embodiments of the present invention provide for an improved fill assembly that is configured to articulate into a compact conformation for ease of transport and installation in a cooling tower and a method of installing the improved fill assembly in the cooling tower. In some arrangements, the articulating fill assembly is configured to translate sideways into the compact conformation. In other arrangements, the articulating fill assembly is configured to translate from the middle or bi-fold into the compact conformation. It should be understood, however, that the present invention is not limited to translating or bi-folding articulated fill assemblies, but rather, may include multi-fold, pleated, or accordion folding conformations. Preferred embodiments of the invention will now be further described with reference to the drawing figures, in which like reference numerals refer to like parts throughout.

Turning now to the drawings, FIG. 1 is a partial cross sectional view of a cooling tower 10 suitable for use with an embodiment of the present invention. As shown in FIG. 1, the cooling tower 10 includes a shell 12, support structure 14, articulated fill assembly 16, water supply assembly 18, collection basin 20, and a fan 22. The shell 12 is configured to control a flow of air across the articulated fill assembly 16. In this regard, ends of the cooling tower 10 may be configured to reduce air infiltration while the sides may include louvers 24 to allow the flow of air to enter the cooling tower 10 and flow across the articulated fill assembly 16. In addition, the louvers 24 may be configured to redirect splashing water back into the cooling tower 10.

The support structure 14 includes columns 26 and diagonal members 28 to provide support for the other elements of the cooling tower 10 and to provide resistances to lateral movement or drift. In addition, the support structure includes one or more nailer 30 to provide a support from which to hang the articulated fill assembly 16. The nailers 30 are in turn supported by girls 32 which attach to columns 26. Optionally, the shell may be configured to provide some or all of the support for the cooling tower 10.

The water supply assembly 18 includes a water supply line 40, flow control valves 42, and a distribution basin 44. The water supply line 40 is configured to convey water and/or other coolant from a suitable heat source to the distribution basin. Suitable heat sources include, for example, a power plant, refrigeration unit, or the like. The flow control valve 42 is configured to modulated the flow of water from the water supply line 40 to the distribution basin 44. The distribution basin 44 is configured to provide a substantially evenly distributed flow of the water across the top of the articulated fill assembly 16. The articulated fill assembly 16 is configured to further distribute or otherwise increase the surface area of water interacting with the flow of air supplied by the fan 22. In this manner, waste heat is removed from the water. Thereafter, the cooled water is collected in the collection basin 20.

Figure 2:
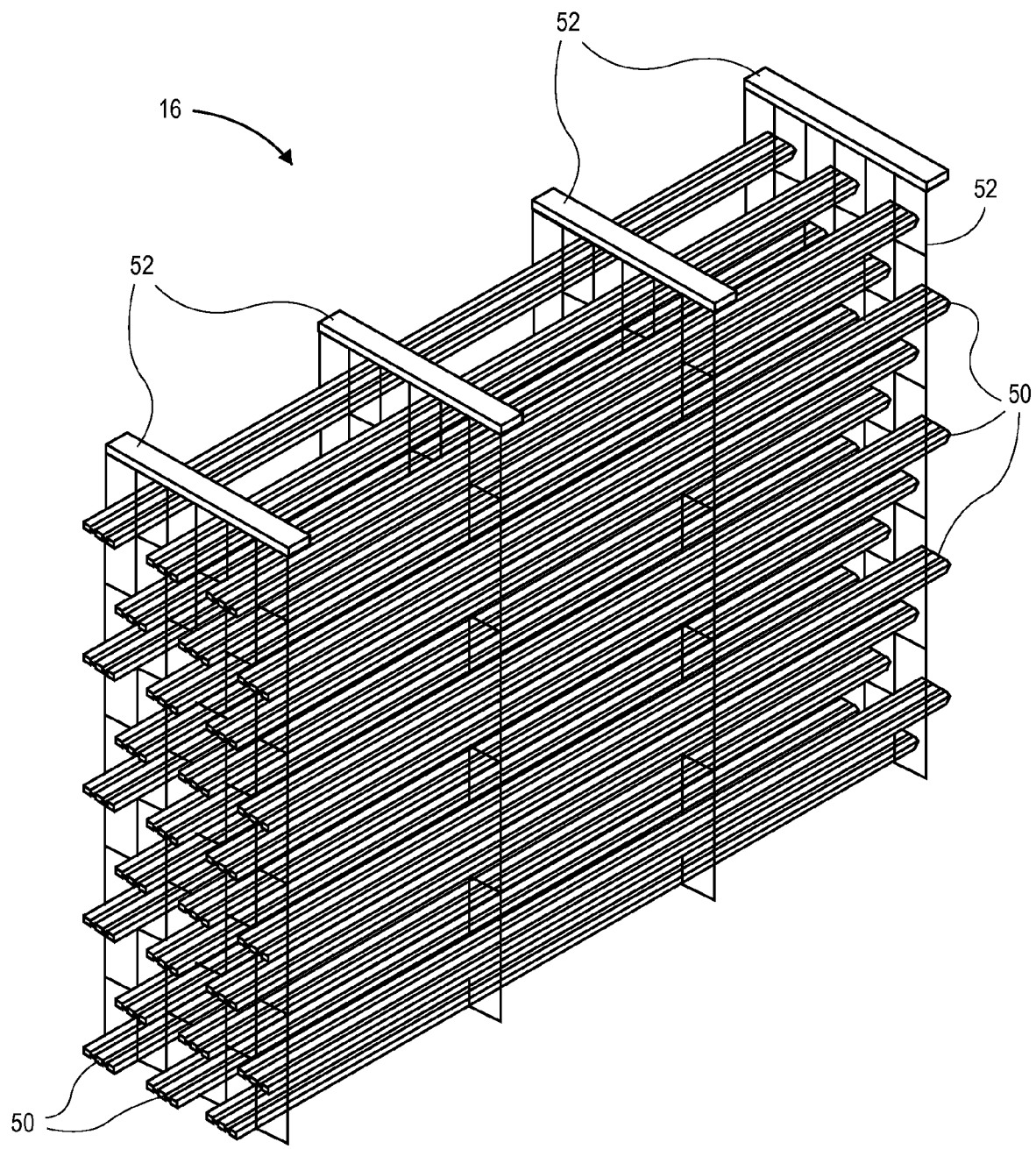
FIG. 2 is a perspective view of an articulated fill assembly for the cooling tower depicted in FIG. 1.

FIG. 2 is a perspective view of the articulated fill assembly 16 for the cooling tower depicted in FIG. 1. As shown in FIG. 2, the articulated fill assembly 16 includes a plurality of splash bars 50 supported by a plurality of grids 52. Apparent in FIG. 2, in the fully upright conformation shown, the articulated fill assembly 16 provides sufficient open volume to allow the flow of air to pass therethrough.

Figure 3:
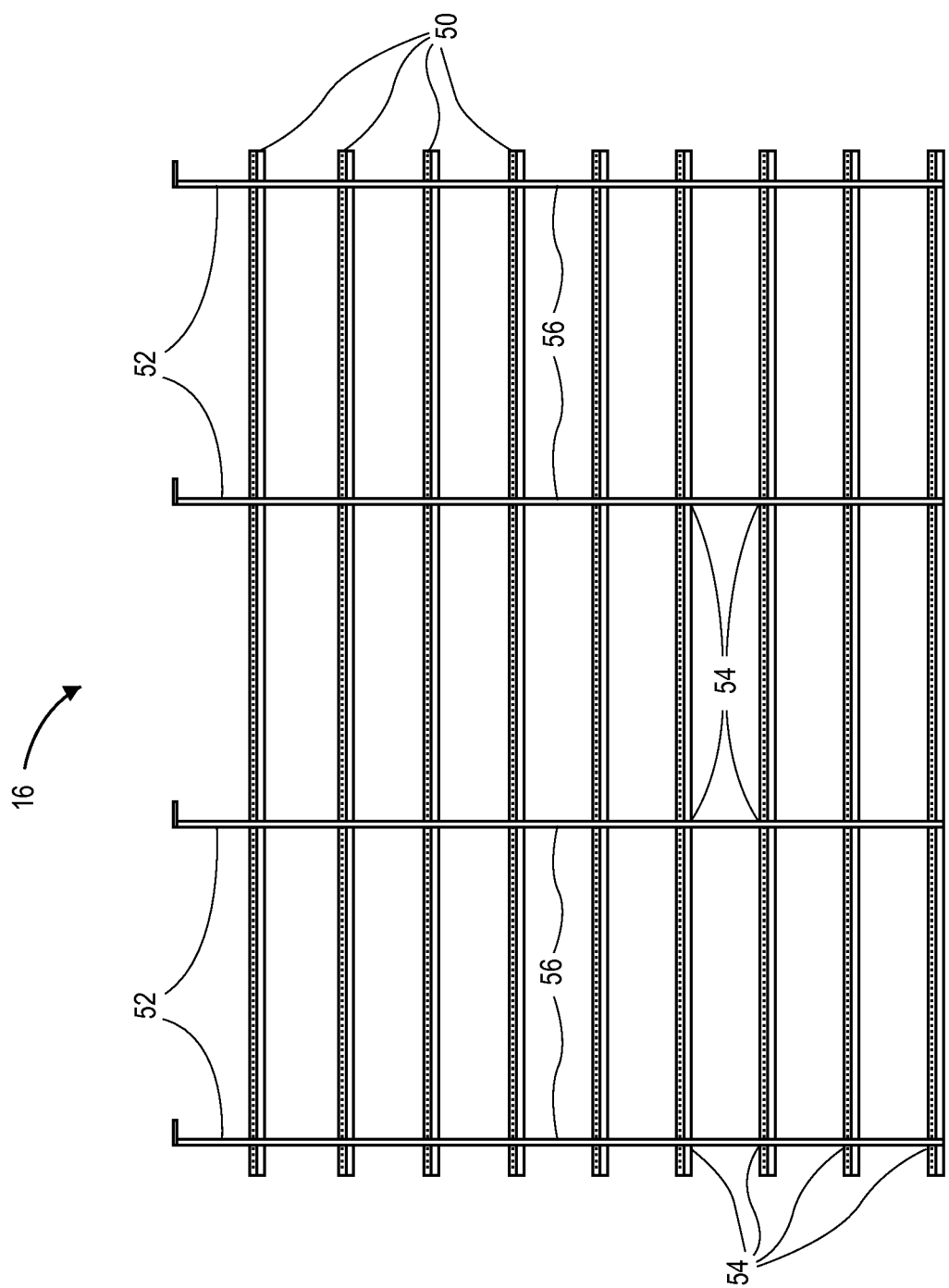
FIG. 3 is a side view of the articulated fill assembly illustrated in FIG. 2.
Figure 4:
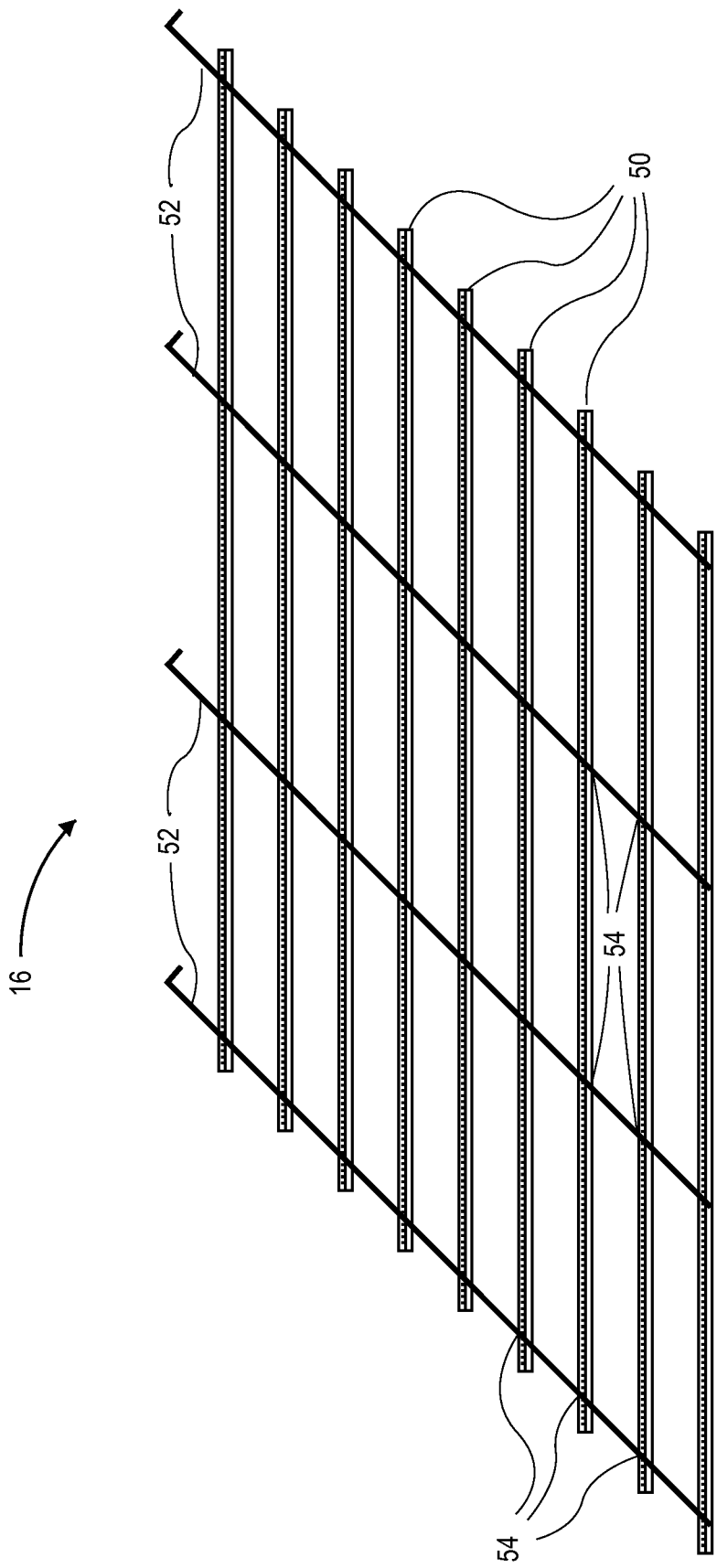
FIG. 4 is a side view of the articulated fill assembly illustrated in FIG. 2 in a partial translated conformation according to an embodiment of the present invention.
Figure 5:
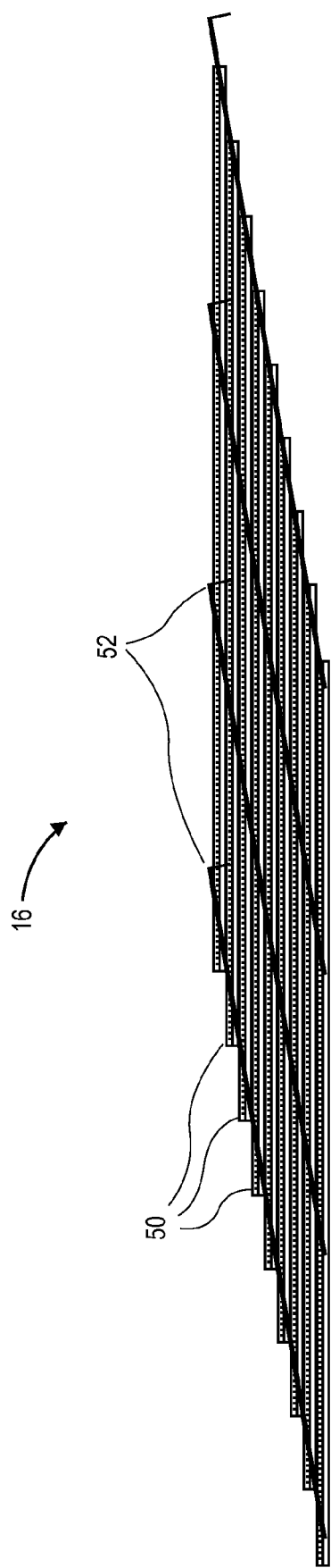
FIG. 5 is a side view of the articulated fill assembly illustrated in FIG. 2 in a fully translated conformation according to the embodiment of FIG. 4.

FIG. 3 is a side view of the articulated fill assembly 16 illustrated in FIG. 2. As shown in FIG. 3, the articulated fill assembly 16 includes a plurality pivot connections 54 disposed at the intersection between the splash bars 50 and grids 52. The pivot connections 54 are configured to allow the splash bars 50 to pivot relative to the grids 52 as shown in FIGS. 4-5. Optionally, the articulated fill assembly 16 includes a plurality of grid articulations 56. If included, the grid articulations 56 facilitate folding the grids 52 in half or portions as shown in FIGS. 6-7.

FIG. 4 is a side view of the articulated fill assembly 16 illustrated in FIG. 2 in a partial translated conformation according to an embodiment of the present invention. As shown in FIGS. 4-5, the pivot connections 54 are configured to allow the splash bars 50 to translate or pivot relative to the grids 52 as shown. FIG. 5 is a side view of the articulated fill assembly 16 illustrated in FIG. 2 in a fully translated or compact conformation according to the embodiment of FIG. 4. As shown in FIG. 5, the volume of the articulated fill assembly 16 in the fully translated conformation is reduced relative to the articulated fill assembly 16 in the fully upright conformation shown in FIGS. 2-3. This reduced volume facilitates shipping, moving, and installation of the articulated fill assembly 16. In addition, the articulated fill assembly 16 has the added benefit of being able to be assembled in a factory or out in the open rather than being assembles within the confines of the cooling tower 10. As such, the articulated fill assembly 16 can be assembled more quickly.

Figure 6:
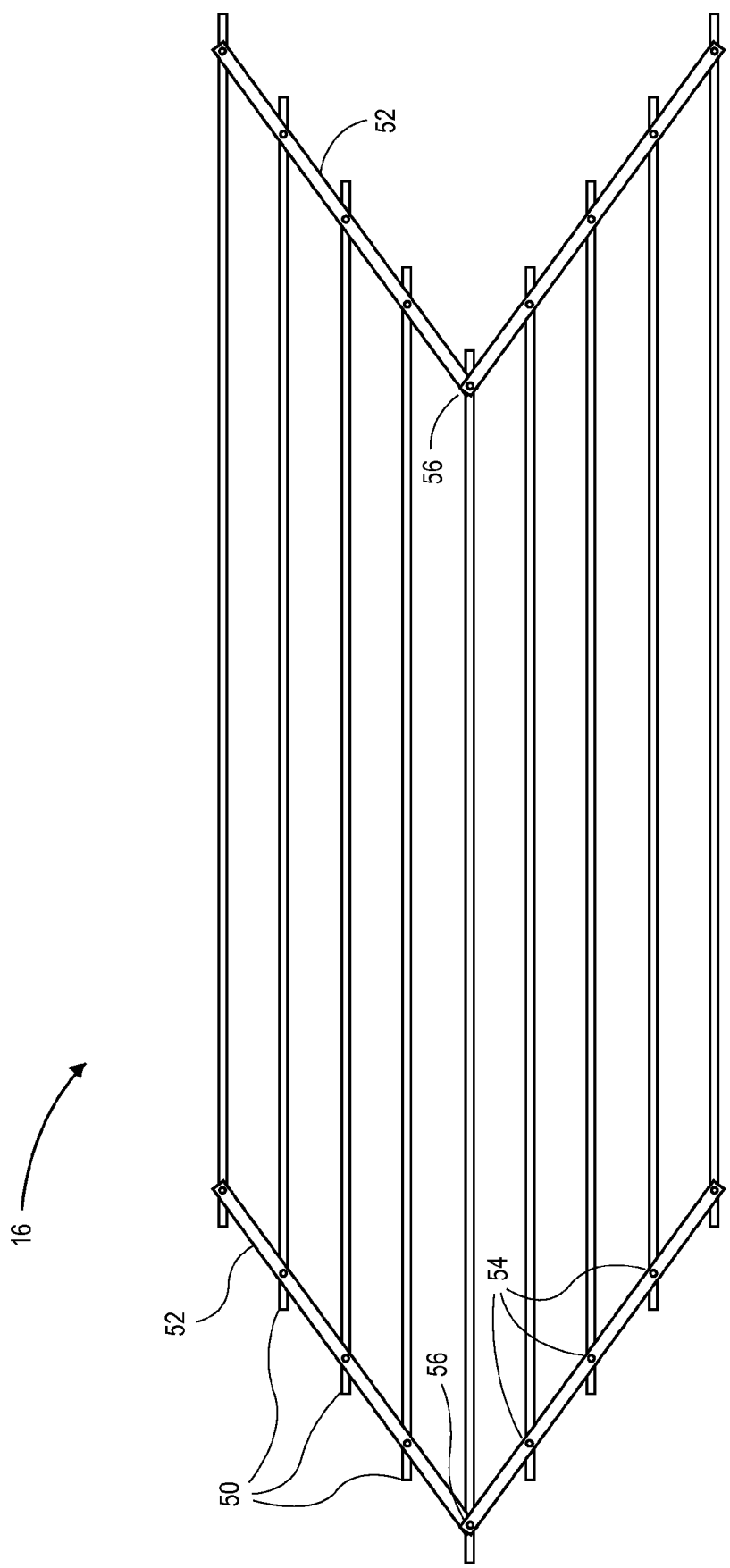
FIG. 6 is a side view of the articulated fill assembly illustrated in FIG. 2 in a partial translated conformation according to another embodiment of the present invention.
Figure 7:
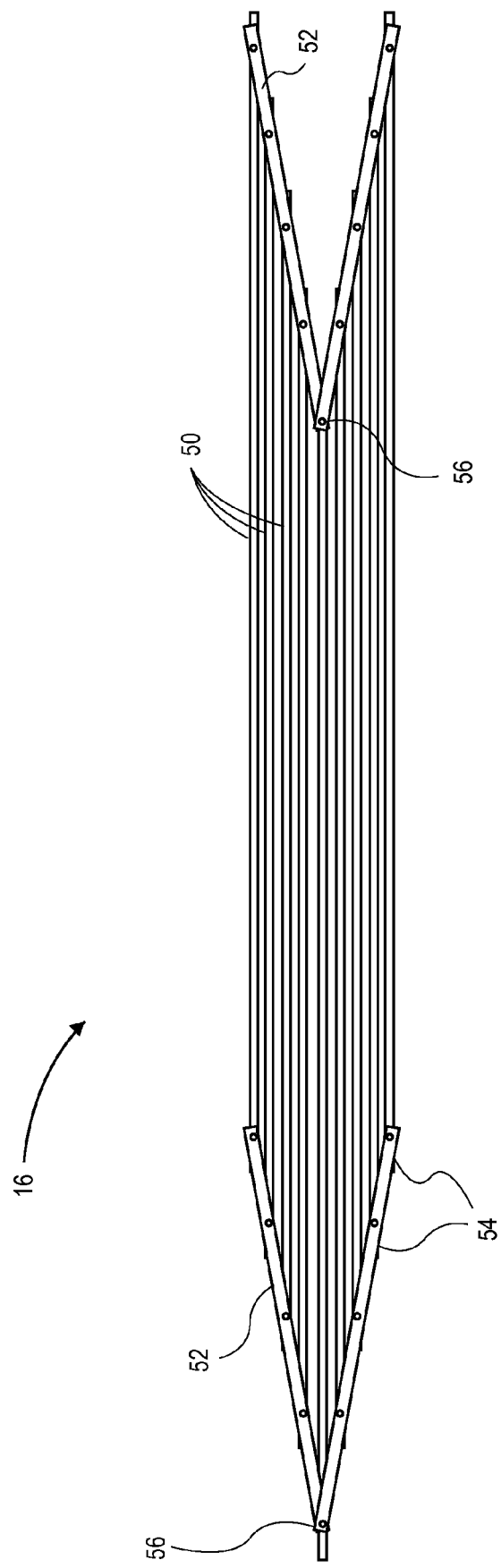
FIG. 7 is a side view of the articulated fill assembly illustrated in FIG. 2 in a fully translated conformation according to the embodiment of FIG. 6.

FIGS. 6 and 7 are side views of the articulated fill assembly 16 illustrated in FIG. 2 in a partial and fully translated conformation according to another embodiment of the present invention. As shown in FIGS. 6-7, the optional grid articulations 56 are configured to facilitate a reduced length of the articulated fill assembly 16 in fully translated conformation. For comparison, the articulated fill assembly 16 in fully translated conformation shown in FIG. 5 is relatively longer than the articulated fill assembly 16 in fully translated conformation shown in FIG. 7, all other things being equal.

Figure 8:
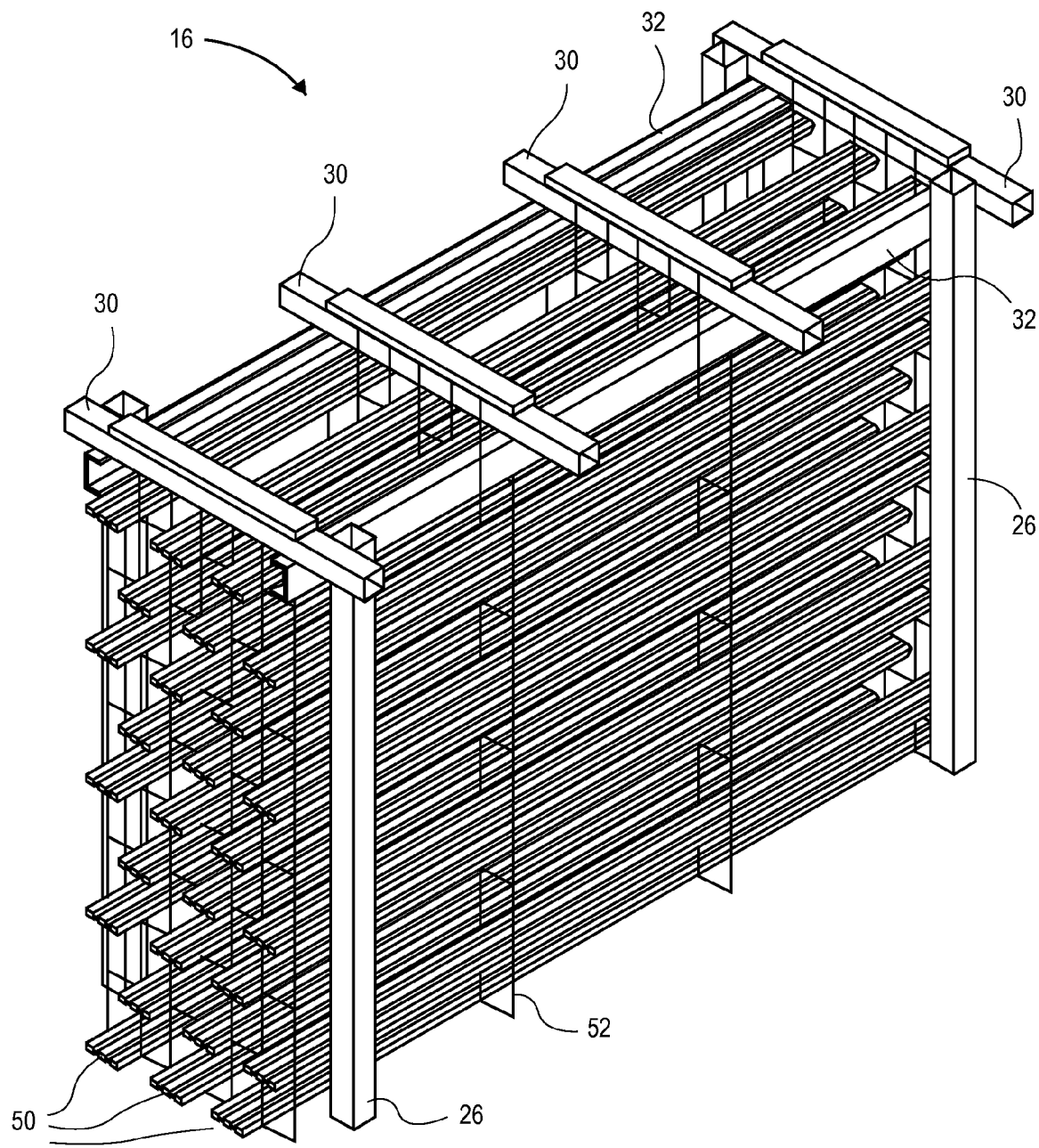
FIG. 8 is a perspective view of a support unit for the articulated fill assembly for the cooling tower depicted in FIG. 1.

FIG. 8 is a perspective view of a support unit for the articulated fill assembly 16 for the cooling tower 10 depicted in FIG. 1. As shown in FIG. 8, the installed articulated fill assembly 16 includes a plurality of nailers 30, with each grid 52 being attached to and hung from a respective nailer 30. The nailers 30, in turn, are supported by the girts 32. By hanging the articulated fill assembly 16 by the top of the articulated fill assembly 16, the articulated fill assembly 16 naturally expands into the fully upright conformation.

Figure 9:
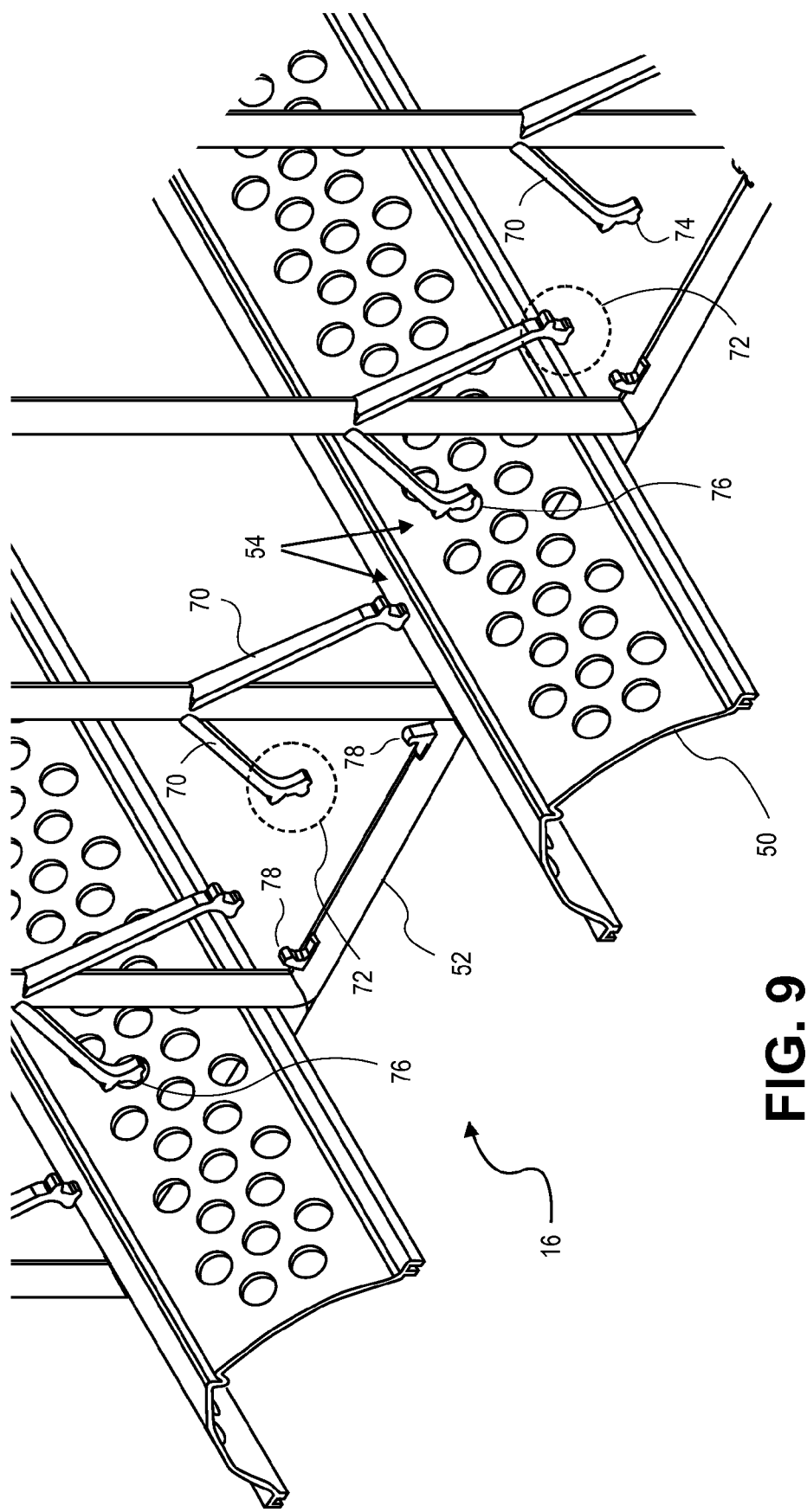
FIG. 9 is a perspective view of a pivot connection for the articulated fill assembly illustrated in FIG. 2 according to an embodiment of the present invention.

FIG. 9 is a perspective view of the pivot connection 54 for the articulated fill assembly 16 illustrated in FIG. 2 according to an embodiment of the present invention. As shown in FIG. 9, the pivot connection 54 includes a pivot arm 70, pivot head 72, pivot shaft 74, and pivot bore 76. The pivot arm 70 is configured to engage the splash bar 50 via the pivot head 72. The pivot head 72 is configured to retain the splash bar 50 down against the grid 52 while providing a pivoting connection via the pivot shaft 74 disposed in the pivot bore 76. To assemble, the pivot arm 70 may be sufficiently flexible to allow the splash bar 50 to be snapped in place. For example, the pivot arm 70 may be a polymer. Optionally, the pivot connection 54 may include one or a pair of centering posts 78 to retain the splash bar 50 in the center of the opening of the grid 52.

Figure 10:
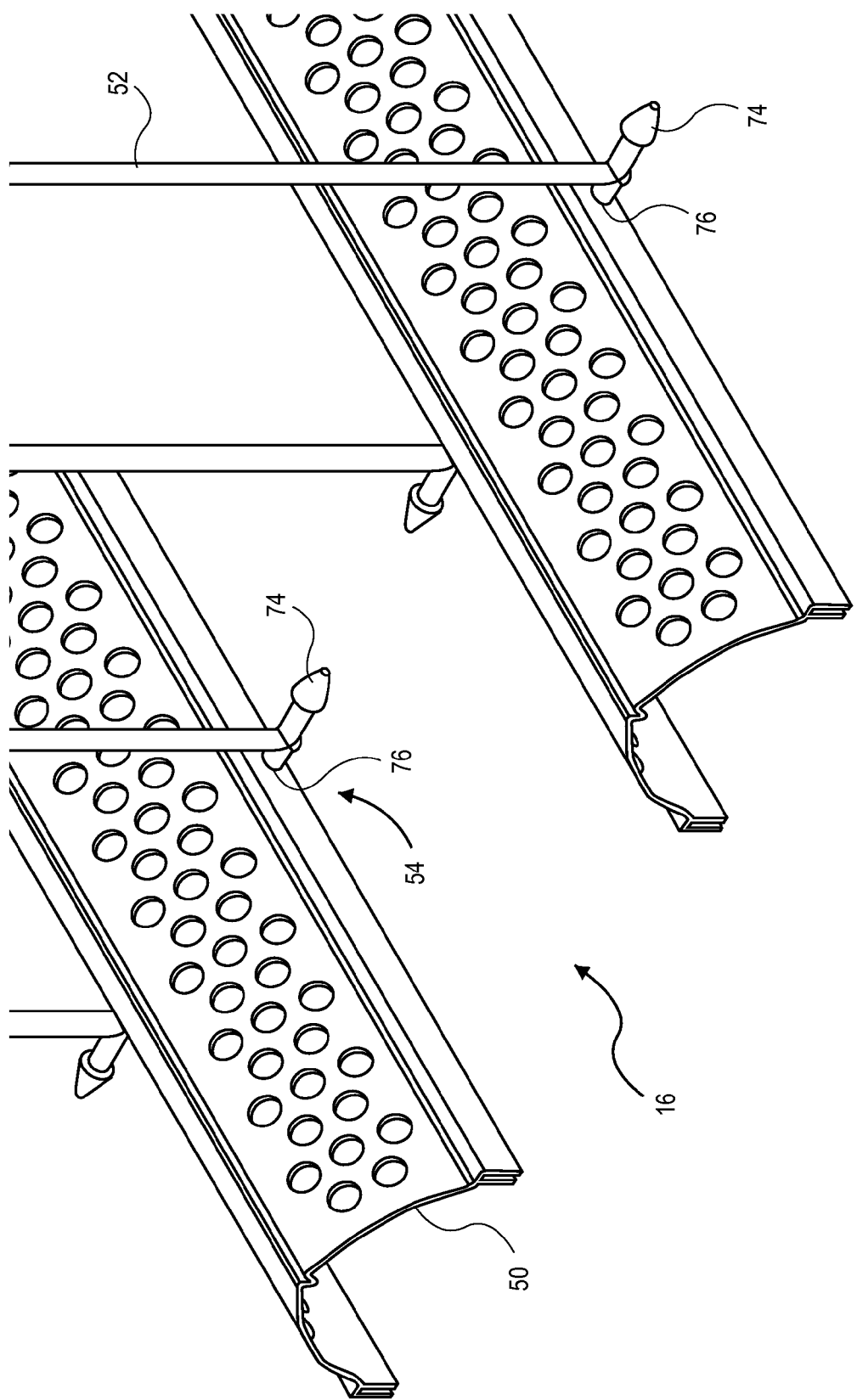
FIG. 10 is a perspective view of another pivot connection for the articulated fill assembly illustrated in FIG. 2 according to another embodiment of the present invention.
Figure 11:
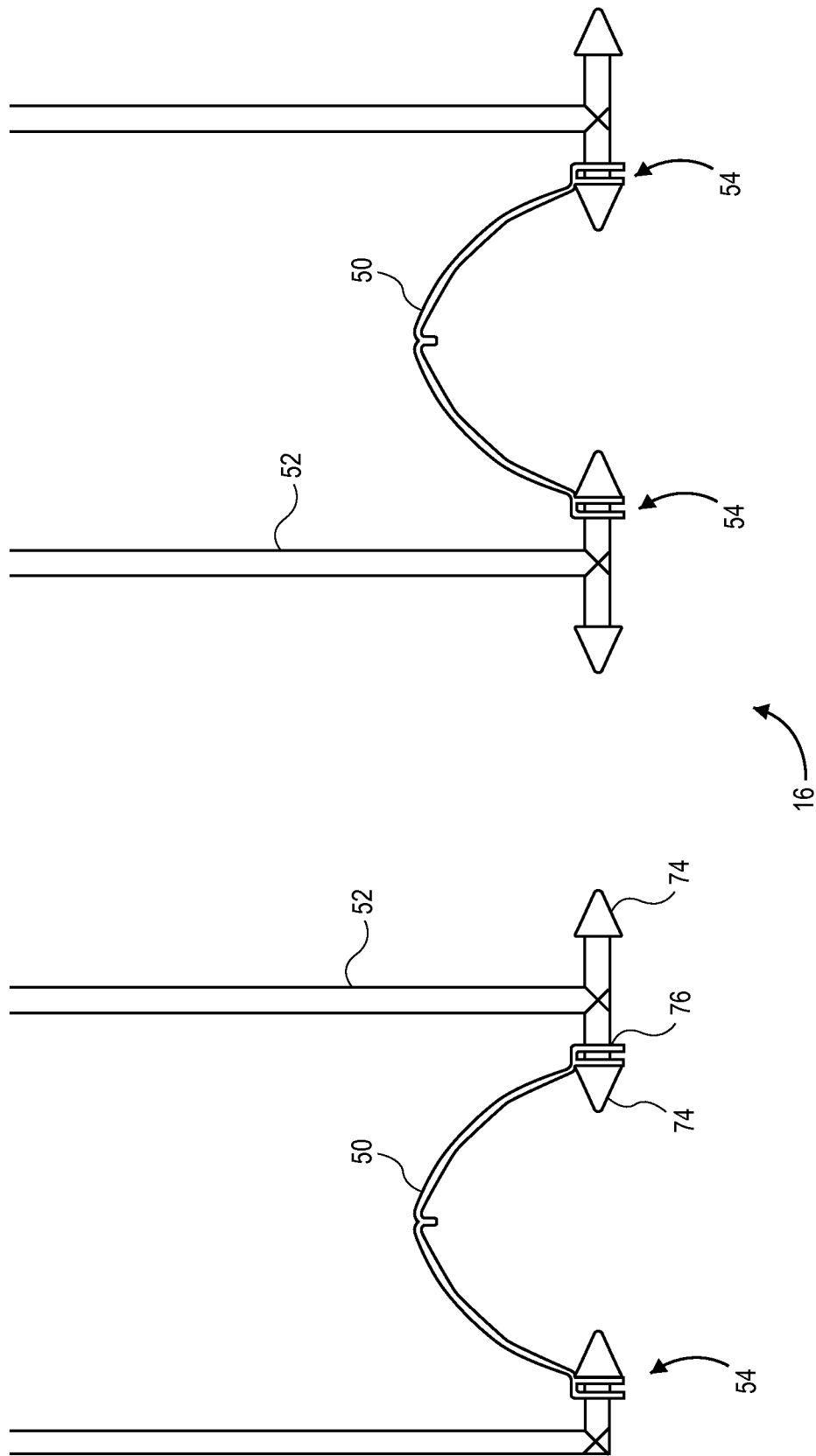
FIG. 11 is an end view of the pivot connection for the articulated fill assembly illustrated in FIG. 2 according to the embodiment of FIG. 10.

FIG. 10 is a perspective view of another pivot connection 54 for the articulated fill assembly 16 illustrated in FIG. 2 according to another embodiment of the present invention. The pivot connection 54 of FIG. 10 is similar to the pivot connection 54 described herein above with reference to FIG. 9 and thus, for the sake of brevity, those item described herein above will not be described again. As shown in FIG. 10, the pivot shaft 74 includes a barb to engage the pivot bore 76. To ease insertion, one or both of the pivot shaft 74 and/or material around the pivot bore 76 may be flexible or elastomeric. An end view of the pivot connection 54 is shown in FIG. 11.

Figure 12:
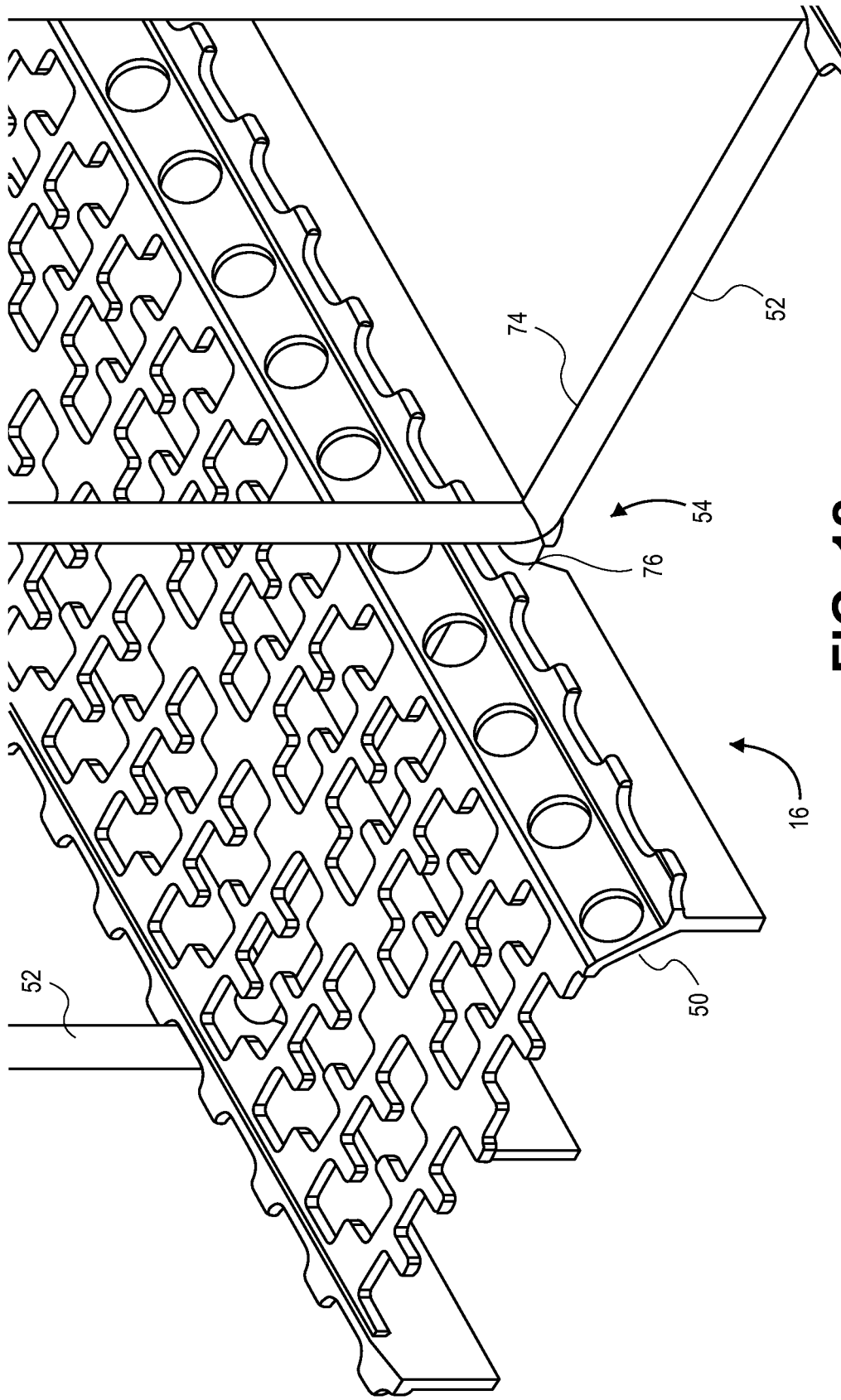
FIG. 12 is a perspective view of yet another pivot connection for the articulated fill assembly illustrated in FIG. 2 according to yet another embodiment of the present invention.
Figure 13:
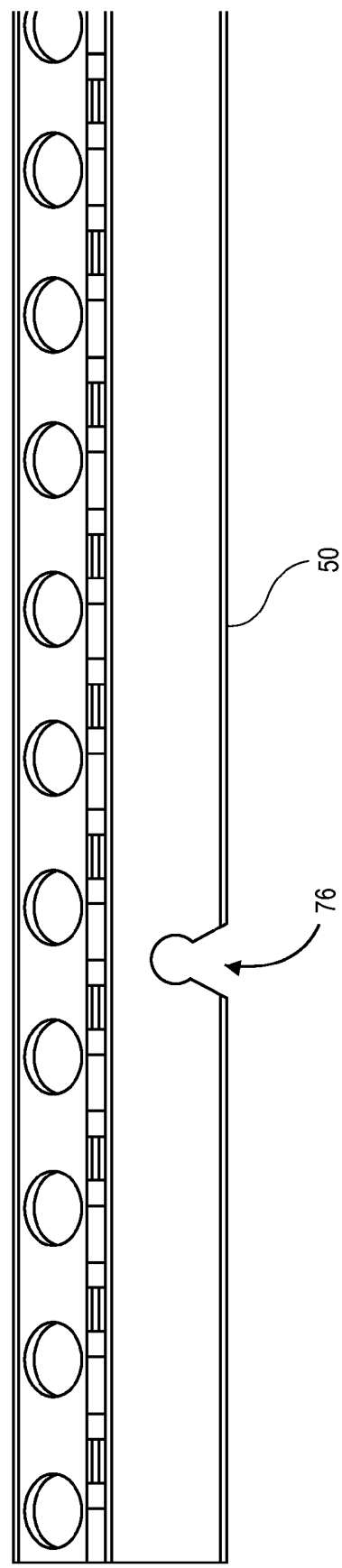
FIG. 13 is a side view of the pivot connection for the articulated fill assembly illustrated in FIG. 2 according to the embodiment of FIG. 12.

FIG. 12 is a perspective view of yet another pivot connection 54 for the articulated fill assembly 16 illustrated in FIG. 2 according to yet another embodiment of the present invention. The pivot connection 54 of FIG. 12 is similar to the pivot connection 54 described herein above with reference to FIGS. 9-11 and thus, for the sake of brevity, those item described herein above will not be described again. As shown in FIG. 12, the pivot shaft 74 is a horizontal portion of the grid 52 that engages the pivot bore 76. In this example, the pivot bore 76 may be similar to a flared key-hole slot configured to snap over the pivot shaft 74. The particular shape of the pivot bore 76 is shown in the side view at FIG. 13.

Figure 14:
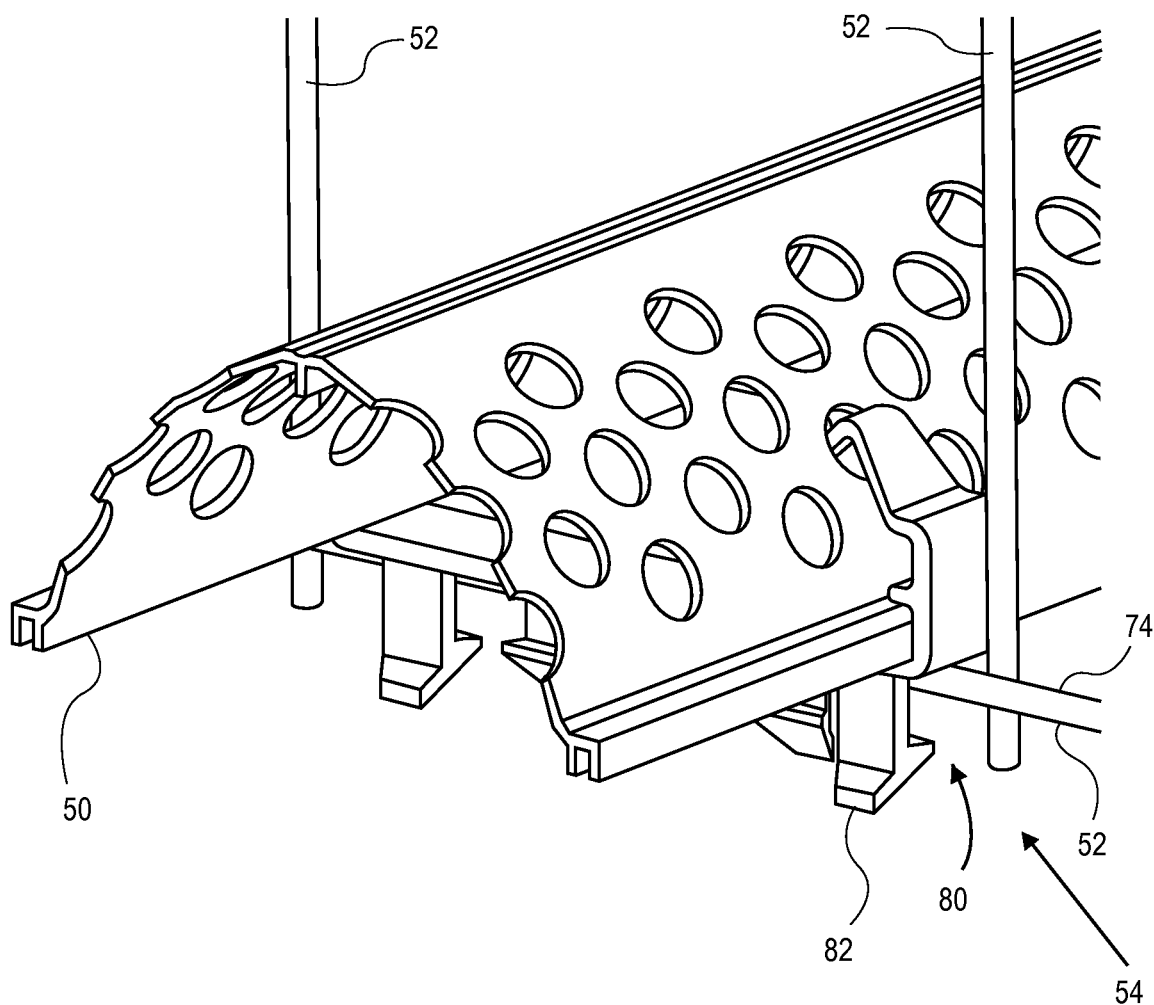
FIG. 14 is a perspective view of yet another pivot connection for the articulated fill assembly illustrated in FIG. 2 according to yet another embodiment of the present invention.

FIG. 14 is a perspective view of yet another pivot connection 54 for the articulated fill assembly 16 illustrated in FIG. 2 according to yet another embodiment of the present invention. According to this embodiment, the splash bar 50 is retained by a bench 80. As shown in FIG. 14, a lower portion 82 of the bench 80 is configured to pivotally engage or attach to the pivot shaft 74. In general, the bench 80 may be made of any suitable material such as, for example, metal, plastic, or other such elastomeric material.

Figure 15:
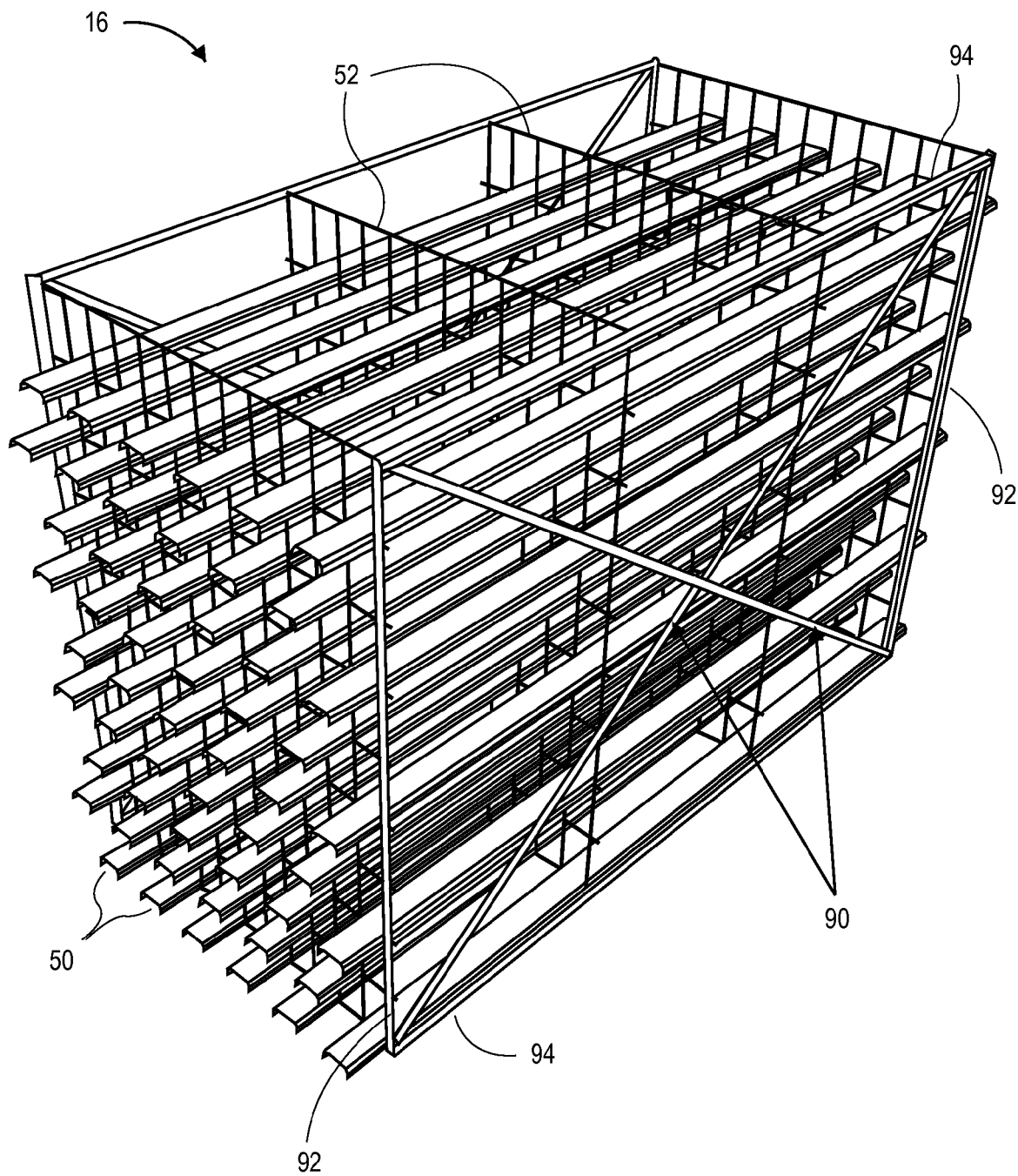
FIG. 15 is another perspective view of the articulated fill assembly for the cooling tower depicted in FIG. 1.

FIG. 15 is another perspective view of the articulated fill assembly 16 for the cooling tower 10 depicted in FIG. 1. As shown in FIG. 15, the articulated fill assembly 16 includes one or more crossbars 90. The crossbars 90 are configured to provide sufficient lateral stability to the articulated fill assembly 16 so that the articulated fill assembly 16 can stand in the upright conformation without being supported from above. In this embodiment, the articulated fill assembly 16 may be placed in the cooling tower 10 in the compact conformation as described herein and then urged into the upright conformation. Once in the upright conformation, the crossbars 90 may be installed. Vertical members 92 and horizontal members 94 may be added to provide additional support and stability. Horizontal members transverse to horizontal members 94 (not shown) may also be added.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A grid to support a plurality of splash bars in an evaporative cooling tower, the grid comprising:
   a nailer to mount the grid in the evaporative cooling tower;
   a plurality of vertical members suspended from the nailer;
   a plurality of splash bars pivotally connected to adjacent vertical member of the plurality of vertical members, wherein the grid is configured to translate from an upright conformation to a compact conformation in response to the plurality of splash bars pivoting relative to the plurality of vertical members.

2. The grid according to claim 1, further comprising:
   a plurality of horizontal member disposed between the plurality of vertical members to form the grid.

3. The grid according to claim 1, further comprising:
   a grid pivot disposed between a first portion of the grid and a second portion of the grid, wherein the first portion of the grid and the second portion of the grid are configured to fold back upon each other in response to the fill assembly being in the compact conformation.

4. The grid according to claim 1, further comprising:
   a girt disposed in the evaporative cooling tower, wherein the girt is configured to support the nailer.

5. The grid according to claim 1, further comprising:
   a pivot arm extending from each of the vertical members;
   a pivot head disposed at a distal end of the pivot head; and
   a pivot shaft extending from the pivot head.

6. The grid according to claim 5, wherein each of the plurality of splash bars further comprises:
   a pivot bore configured to mate with the pivot shaft.

7. The grid according to claim 6, wherein the pivot connection further comprises:
   an elastomeric barb to engage the pivot bore.

8. The grid according to claim 5, wherein each of the plurality of splash bars further comprises:
   a flared key-hole slot configured to snap over the pivot shaft.

9. An evaporative cooling tower comprising:
   a tower shell;
   a water supply assembly;
   a fan; and
   a fill assembly for evaporative cooling, the fill assembly being disposed in the tower shell, the water supply assembly being configured to provide a supply of water to the fill assembly and the fan being configured to generate a flow of air across the fill assembly, the fill assembly including:
      a plurality of splash bars;
      a grid to support the plurality of splash bars; and
      a pivot connection disposed at an intersection between the grid and a splash bar of the plurality of splash bars, wherein the fill assembly is configured to translate from an upright conformation to a compact conformation in response to the plurality of splash bars pivoting relative to the grid.

10. The evaporative cooling tower according to claim 9, further comprising:
    a plurality of the pivot connections, wherein each intersection between the grid and a splash bar of the plurality of splash bars includes a respective pivot connection of the plurality of pivot connections.

11. The evaporative cooling tower according to claim 9, further comprising:
a grid pivot disposed between a first portion of the grid and a second portion of the grid, wherein the first portion of the grid and the second portion of the grid are configured to fold back upon each other in response to the fill assembly being in the compact conformation.

12. The evaporative cooling tower according to claim 9, further comprising:
a nailer disposed at a top portion of the grid, wherein the grid is suspended by the nailer.

13. The evaporative cooling tower according to claim 9, wherein the pivot connection further comprises:
a pivot arm extending from the grid;
a pivot head disposed at a distal end of the pivot head; and
a pivot shaft extending from the pivot head.

14. The evaporative cooling tower according to claim 13, wherein each of the plurality of splash bars further comprises:
a pivot bore configured to mate with the pivot shaft.

15. The evaporative cooling tower according to claim 14, wherein the pivot connection further comprises:
an elastomeric barb to engage the pivot bore.

16. The evaporative cooling tower according to claim 13, wherein each of the plurality of splash bars further comprises:
a flared key-hole slot configured to snap over the pivot shaft.

17. A method for installing a fill assembly in a cooling tower, the method comprising the steps of:
assembling the fill assembly by generating a pivot connection at an intersection between a grid and a splash bar of a plurality of splash bars, wherein the fill assembly is configured to translate from an upright conformation to a compact conformation in response to the plurality of splash bars pivoting relative to the grid;
translating the fill assembly to the compact conformation;
disposing the fill assembly in the compact conformation into the cooling tower; and
translating the fill assembly from the compact conformation to the upright conformation.

18. The method according to claim 17, further comprising the step of:
generating a plurality of the pivot connections, wherein each intersection between the grid and a splash bar of the plurality of splash bars includes a respective pivot connection of the plurality of pivot connections.

19. The method according to claim 17, further comprising the step of:
disposing a grid pivot between a first portion of the grid and a second portion of the grid, wherein the first portion of the grid and the second portion of the grid are configured to fold back upon each other in response to the fill assembly being in the compact conformation.

20. The method according to claim 17, further comprising the step of:
disposing a nailer at a top portion of the grid, wherein the grid is suspended by the nailer.

* * * * *